(12) United States Patent
Worthington, II et al.

(10) Patent No.: US 6,699,309 B1
(45) Date of Patent: Mar. 2, 2004

(54) DELIVERY SYSTEM FOR CARBON DIOXIDE ABSORPTION MATERIAL

(75) Inventors: James T. Worthington, II, Worthington, OH (US); Mark J. Koenig, Worthington, OH (US); Clifford N. Dodson, Dublin, OH (US); Rodney D. Jenkins, Upper Arlington, OH (US)

(73) Assignee: Battelle Memorial Institute, Columbus, OH (US)

( * ) Notice: Subject to any disclaimer, the term of this patent is extended or adjusted under 35 U.S.C. 154(b) by 0 days.

(21) Appl. No.: 10/104,946

(22) Filed: Mar. 22, 2002

(51) Int. Cl.[7] ............................................. B01D 53/04
(52) U.S. Cl. ........................... 96/108; 96/135; 96/148; 55/422; 55/515; 206/0.7; 220/520
(58) Field of Search ..................... 96/108, 118–120, 96/135, 147, 148; 95/139; 55/357, 381, 385.2, 422, 490, 515; 206/0.7, 756; 220/520, 737, 751

(56) References Cited

U.S. PATENT DOCUMENTS

| 894,973 | A | * | 8/1908 | Morgan | 96/119 |
|---|---|---|---|---|---|
| 3,047,370 | A | * | 7/1962 | Avtges et al. | 96/118 |
| 3,178,269 | A | * | 4/1965 | McConnaughey | |
| 4,029,483 | A | * | 6/1977 | Long | 95/139 |
| 4,401,447 | A | * | 8/1983 | Huber | 96/133 |
| 4,518,402 | A | * | 5/1985 | Dargel | 96/17 |
| 5,148,613 | A | * | 9/1992 | Cullen | 34/81 |
| 5,768,734 | A | * | 6/1998 | Dietrich | 15/1.7 |
| 6,402,811 | B1 | * | 6/2002 | Shanks et al. | 95/90 |
| 6,423,122 | B1 | * | 7/2002 | Kelders | 96/119 |

FOREIGN PATENT DOCUMENTS

JP 04094703 A * 3/1992

OTHER PUBLICATIONS

Picture of French Navy Scrubbing Curtain, date unknown.

* cited by examiner

Primary Examiner—Frank M. Lawrence
(74) Attorney, Agent, or Firm—MacMillan, Sobanski & Todd, LLC

(57) ABSTRACT

A delivery system for carbon dioxide absorption material includes a container for the storage of carbon dioxide absorption material, and a receptacle capable of receiving carbon dioxide absorption materials. The receptacle has a contact limiting membrane that substantially prohibits the passage of particulate matter from the carbon dioxide absorption material and allows the passage of gases therethrough.

23 Claims, 4 Drawing Sheets

DELIVERY SYSTEM FOR CARBON DIOXIDE ABSORPTION MATERIAL

BACKGROUND OF THE INVENTION

This invention relates in general to the removal of carbon dioxide from closed systems, and in particular to an apparatus for safely exposing carbon dioxide absorption materials to the environment.

The removal of carbon dioxide from air is desirable within closed systems where carbon dioxide produced by inhabitants accumulates. The removal of carbon dioxide is critical, so as not to poison the inhabitants. Closed systems where these conditions can exist include but are not limited to submarines, spacecraft, space stations, mines, and tunnels. Generally, an electromechanical apparatus for the removal of carbon dioxide is provided in these closed systems as the primary means for carbon dioxide removal. A backup system for the removal of carbon dioxide is also provided, such as a hopper with multiple open lithium hydroxide canisters. In case of electrical power failure, a system for the removal of carbon dioxide is generally provided that will function without electrical power, such as a canister of lithium hydroxide or a canister of lithium hydroxide with a French Navy scrubbing curtain. The French Navy scrubbing curtain is a mesh sleeve that receives the lithium hydroxide crystals of the canister.

SUMMARY OF THE INVENTION

This invention relates to a delivery system for carbon dioxide absorption material. The delivery system includes a container for the storage of carbon dioxide absorption material, and a receptacle capable of receiving carbon dioxide absorption materials. The receptacle has a contact limiting membrane that substantially prohibits the passage of particulate matter from the carbon dioxide absorption material and allows the passage of gases therethrough.

According the this invention, there is also provided a delivery system for carbon dioxide absorption material, with the delivery system including a container for the storage of carbon dioxide absorption material, and a receptacle capable of receiving carbon dioxide absorption materials. The receptacle has a contact limiting membrane that substantially prohibits the passage of liquid water and allows the passage of water vapor therethrough.

According the this invention, there is also provided a delivery system for lithium hydroxide, including a container for the storage of lithium hydroxide, and a receptacle connected to the canister and capable of receiving lithium hydroxide. The receptacle has chambers that are open to the canister. The receptacle has a contact limiting membrane that substantially prohibits the passage of liquid water and particulate matter and allows the passage of gases and water vapor therethrough.

According the this invention, there is also provided a method of storing delivery system components for carbon dioxide absorption materials A plurality of receptacles capable of receiving carbon dioxide absorption materials are wrapped around a hollow tube. The plurality of receptacles and the tube are placed inside a container. Various objects and advantages of this invention will become apparent to those skilled in the art from the following detailed description of the preferred embodiment, when read in light of the accompanying drawings.

DETAILED DESCRIPTION OF THE INVENTION

Figure 1:
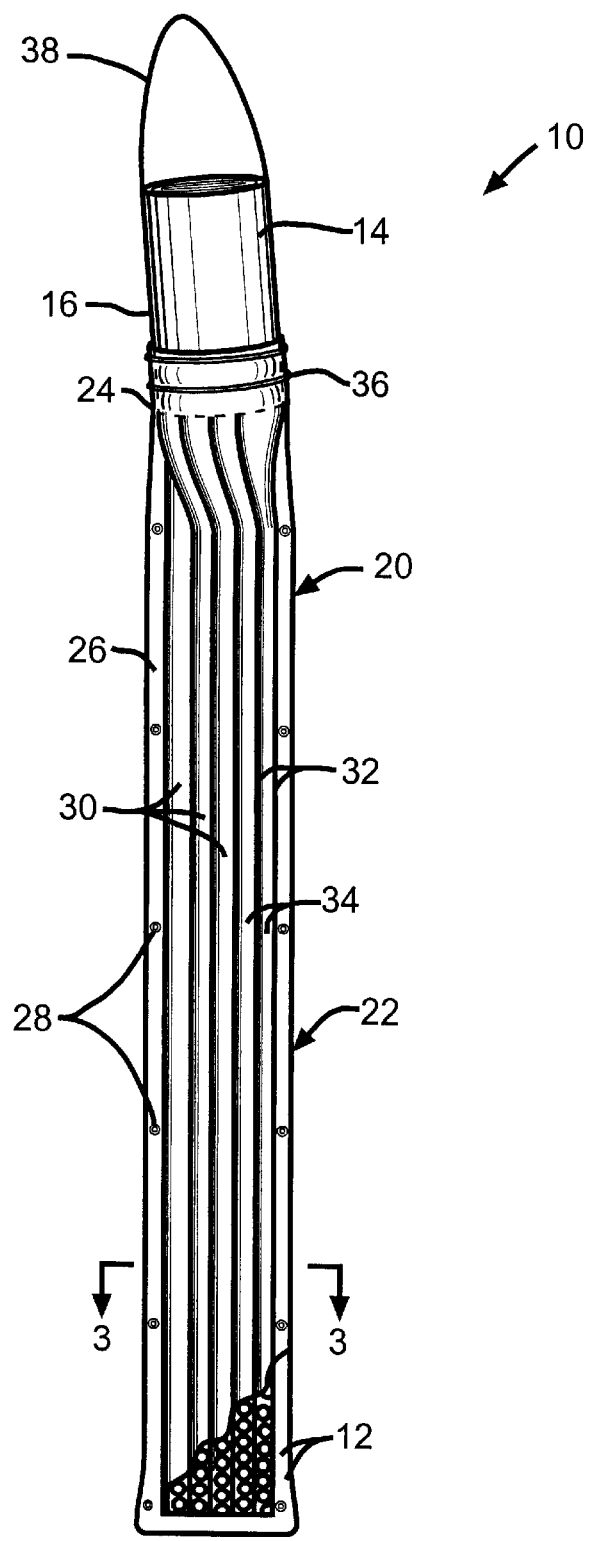
FIG. 1 is a schematic elevational view of the delivery system with a partially cut-away view of the receptacle showing the carbon dioxide absorption materials, in accordance with the present invention.

Referring now to the drawings, there is illustrated in FIG. 1 a delivery system, indicated generally at 10, in accordance with this invention. The delivery system 10 exposes carbon dioxide absorption materials 12 to the surrounding ambient air, while limiting the contact between the carbon dioxide absorption materials 12 and the environment.

A carbon dioxide absorption material 12 is provided to react when exposed to carbon dioxide to eliminate carbon dioxide and produce other byproducts. A common carbon dioxide absorption material is lithium hydroxide. Lithium hydroxide is commercially available from Molecular Products Ltd. and FMC Lithium. In an exothermic reaction, anhydrous lithium hydroxide is transformed into lithium hydroxide monohydrate by the following equation:

$$LiOH + H_2O(vapor) \rightarrow LiOH.H_2O$$

In a second endothermic reaction, lithium hydroxide monohydrate combines with carbon dioxide to form lithium carbonate and water vapor by the following equation:

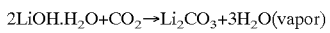

$$2LiOH.H_2O + CO_2 \rightarrow Li_2CO_3 + 3H_2O(vapor)$$

The net reaction can be described by the following equation:

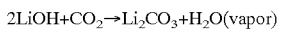

$$2LiOH + CO_2 \rightarrow Li_2CO_3 + H_2O(vapor)$$

Another example of carbon dioxide absorption materials is commonly called soda lime. Soda lime is a compound that consists primarily of calcium hydroxide, water, sodium hydroxide and potassium hydroxide. Soda lime is commercially available as SodaSorb® manufactured by W. R. Grace and Sofnolime manufactured by Molecular Products Ltd.

A canister 14 for the storage of carbon dioxide absorption materials 12 is provided. The canister 14 can be the illustrated conventional lithium hydroxide canister, although any container for holding the carbon dioxide absorption material may be used. Examples of such containers include boxes, bags, and cartons. The conventional lithium hydroxide canister is typically labeled as having a gross weight of 8.1 pounds and a net weight of 6.3 pounds, although the actual gross weight of the canister may vary in part due to the moisture content of the lithium hydroxide crystals. The conventional lithium hydroxide canister is cylindrical in shape and has a diameter of approximately 7.4 inches. The conventional lithium hydroxide canister has a removable lid on each of two ends of the canister. The canister 14, as illustrated, has an end 16 with a removable lid, not shown, to create an opening 18 in the canister 14, shown most clearly in FIG. 2. The opening 18 in the canister 14 may be created by any means.

A receptacle 20 is provided for receiving carbon dioxide absorption materials 12 from the canister 14 when carbon dioxide absorption is desired. As illustrated, the receptacle 20 is a generally rectangular sleeve 22 with one open end 24. The receptacle 20 is constructed of two layers of material which can be bonded together by any method that will not result in breaking of the bonds when the receptacle 20 is stressed by the weight of the receptacle 20 and the carbon dioxide absorption materials 12, which is typically between about 9 pounds to about 11 pounds when the receptacle 20 contains expended carbon dioxide absorption materials. The weight of the receptacle 20 and the carbon dioxide absorption materials 12 will vary depending on the presence of water vapor, water and the amount of moisture absorbed by the carbon dioxide absorption materials. Suitable methods of bonding the layers of material of the receptacle 20 include but are not limited to sewing, ultrasonic welding, and RF welding. The sleeve 22 may be bonded to form at least one flange 26, although such is not required. In a preferred embodiment of the invention, the receptacle 20 has a length within the range of about 5 feet to about 6 feet and a width of about 13 inches when the sleeve 22 is flat. The sleeve 22 has about a 26 inch circumference when the sleeve 22 is opened and expanded. It is to be understood that the receptacle can be any shape suitable for exposing the carbon dioxide absorption materials 12 to the surrounding atmosphere. The sleeve 22 is shown with a partial cut-away portion showing the carbon dioxide absorption materials 12.

The receptacle 20 may be made of any material that substantially prohibits the passage of liquid water and particulate matter and allows the passage of gases, particularly water vapor and carbon dioxide, to facilitate the reaction described above. Preferably, the material of the receptacle 20 also limits or prohibits the passage of carbon dioxide absorption materials 12 through the material. Some carbon dioxide absorption materials create air-borne particles or dust, which can be irritating to human mucus membranes. Therefore, the material of the sleeve 22 is a contact limiting membrane that substantially prohibits the passage of particulate matter from the carbon dioxide absorption material and allows the passage of gases therethrough. Most preferably, the material of the receptacle 20 is of such a nature that it completely blocks the carbon dioxide absorption materials from passing through the material. The preferred carbon dioxide absorption material for use with this invention is lithium hydroxide. Other carbon dioxide absorption materials can also be used. Lithium hydroxide is ineffective when wet and is an inhalation irritant. Lithium hydroxide requires the presence of water vapor to begin the reaction that absorbs carbon dioxide, and water vapor is also a byproduct of this reaction. However, it is desirable to allow water vapor to escape through the receptacle 20, so that the water vapor does not condense within the receptacle 20. The material of the receptacle 20 should not react with the carbon dioxide absorption materials 12, and preferably should have a low flammability and no toxic by-products when combusted. The material may be any flexible material or fabric and is preferably able to be rolled, creased, and folded, so it can be packaged and handled without damage. The material of the receptacle 20 should be light weight and should occupy a minimal amount of space prior to its use, so it can be added to existing closed systems with minimal storage requirements. The material should be low cost and retain the above described characteristics as long as possible so that the usable life of the material is maximized and the cost to provide usable material is minimized.

It has been found that a multi-layer polypropylene material such as Kimguard® or Spunguard® material (a Kimberly-Clark product available from VWR International, Columbus, Ohio) is suitable for this application. The receptacle 20 preferably includes at least one attachment device that is used to support and position the receptacle 20 and the delivery system 10 with respect to the building or vessel in which the delivery system 10 is to be used. As illustrated, the attachment device is a grommet 28, although any attachment device may be used.

Figure 3:
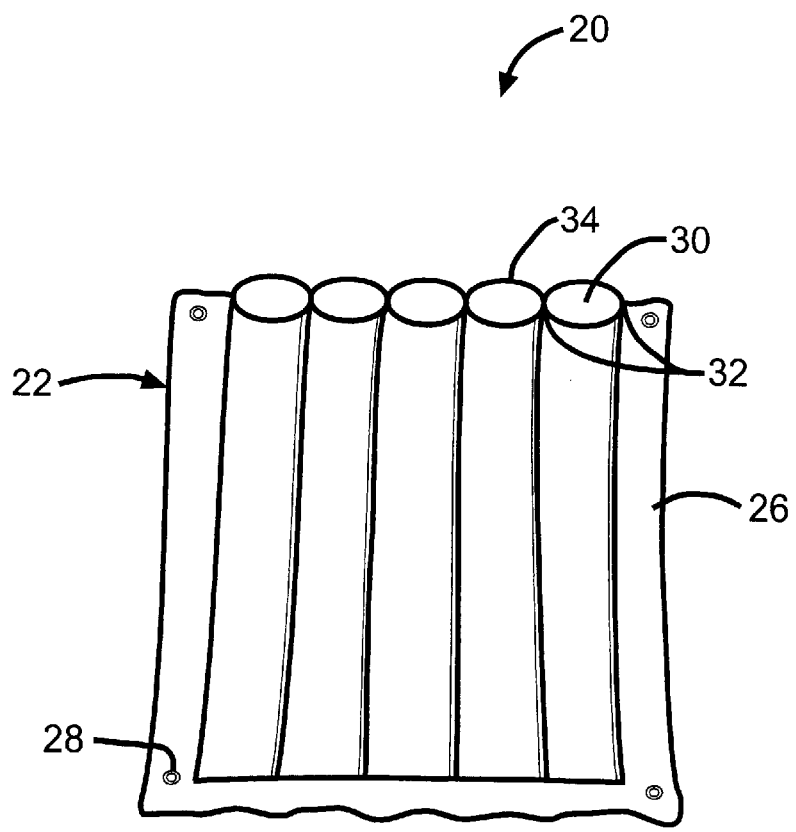
FIG. 3 is a perspective view of the receptacle of the delivery system taken along line 3—3 of FIG. 1.

In a preferred embodiment of the invention, the receptacle 20 is in the form of a plurality of chambers 30, as shown more clearly in FIG. 3. The chambers 30 are formed by longitudinal joints or seams 32 which define the chambers 30 and give them an appearance of longitudinal ribs 34. Each of the chambers 30 is openly connected to the canister 14, so that when the lid is removed and the canister 14 is inverted, the carbon dioxide absorption material 12 will flow by gravity into the chambers 30. When carbon dioxide absorption materials 12 are introduced into the receptacle 20, it is believed that the chambers 30 enable a more even distribution of the carbon dioxide absorption materials 12 throughout the receptacle 20.

In a preferred embodiment of the invention, the receptacle 20 is attached over the opening 18 of the canister 14 using a fastener 36 to connect the receptacle 20 to the canister 14. As illustrated, the fastener 36 is a pair of nylon electrical tie wraps, although any fastener may be used. As illustrated, the receptacle 20 completely covers the opening 18 of the canister 14 and partially covers the canister 14, although such is not required. As shown specifically in FIG. 2, the open end 24 of the receptacle 20 completely circumferentially surrounds the upwardly oriented opening 18 of the canister 14. This will prevent spilling of the carbon dioxide absorption materials 12 when the canister 14 is inverted as shown in FIG. 1. As also shown more specifically in FIG. 2, the open end 24 of the receptacle 20 extends over at least a portion of the length of the canister 14 (i.e. the receptacle 20 partially covers the canister 14). It is contemplated that the receptacle 20 could completely envelop the canister 14 and the open end 24 of the receptacle 20 could be closed using any closing means (not shown). It is also contemplated that the canister 14 could be removed from the delivery system 10 and the open end 24 of the receptacle 20 could be closed using any closing means (not shown).

A hanging means 38 to support the delivery system 10 may be provided and can be attached to the canister 14, the receptacle 20 or the fastener 36, although such is not required. The delivery system 10 may be hung in a variety of positions, but it is believed that when the carbon dioxide absorption material is lithium hydroxide, the best absorption rates are achieved when the receptacle 20 is hung in a vertical manner as illustrated in FIG. 1. The curtain may also be hung in a vertical manner by being draped over a horizontal line or rod or laid on a horizontal surface. It is believed that circulation of the air surrounding the receptacle 20 will increase absorption rates of the carbon dioxide absorption materials.

Figure 2:
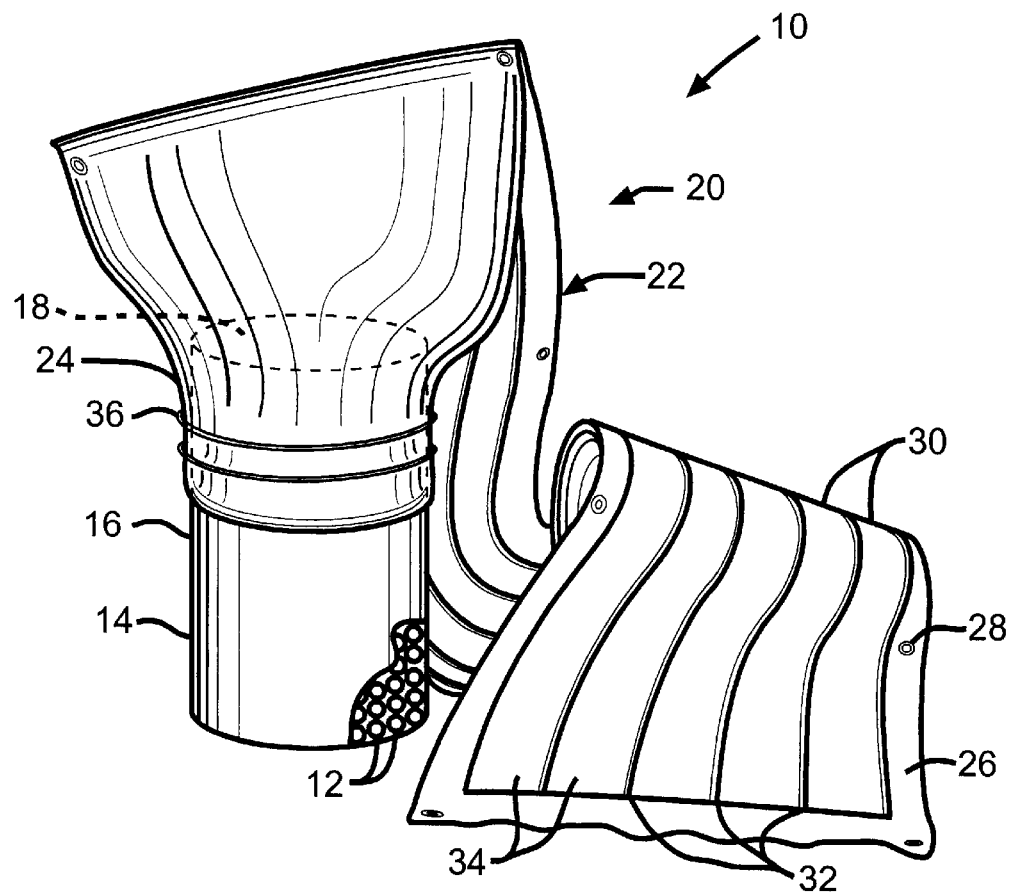
FIG. 2 is an elevational view of the delivery system before carbon dioxide absorption material is received in the receptacle of the delivery system with a partially cut-away view of the canister showing the carbon dioxide absorption materials, in accordance with the present invention.

The delivery system 10 has the carbon dioxide absorption materials 12 inside the canister 14, as is shown in the partial cut-away view of the canister 14 in FIG. 2. The receptacle 20 has been fastened over the opening 18 of the canister 14. The delivery system 10 is ready to be vertically positioned, which will move the carbon dioxide absorption materials 12 from the canister 14 into the receptacle 20.

Figure 4:
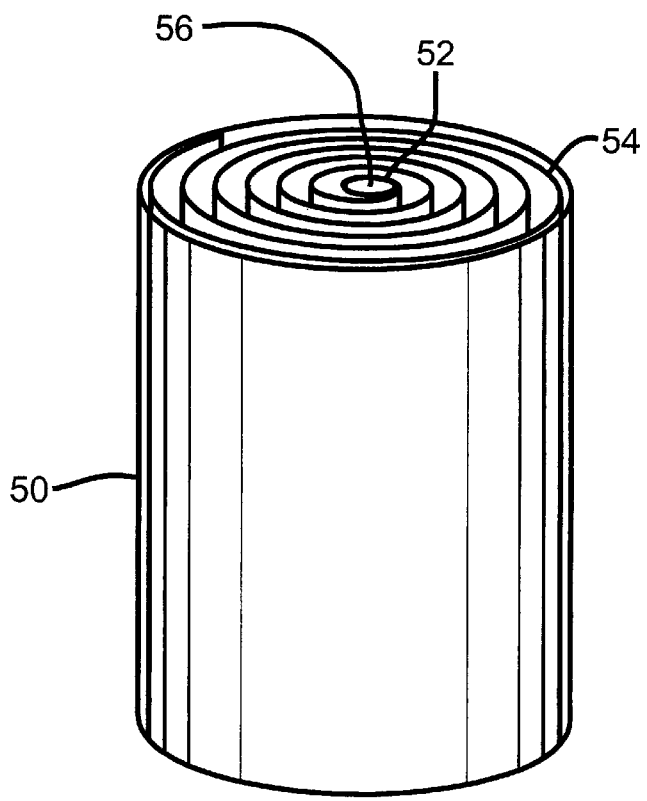
FIG. 4 is a schematic view of a storage canister for storing receptacles according to the invention.

A storage canister 50 for storing receptacles is shown in FIG. 4. The storage canister is preferably similar in size and shape to the canister 14 shown in FIG. 1 for storing the carbon dioxide absorption materials. A cylindrical hollow tube 52 with a length equal to or less than the height of the canister 50 is provided, and a plurality of receptacles 54 may be rolled around the tube 52, and the receptacles 54 and tube 52 may be stored within the canister 50. When the tube 52 and the receptacle 54 are stored within the canister 50, a void 56 is formed within the canister 50, inside the hollow center opening of the tube 52. Preferably, additional materials such as one or more fasteners, hanging means and instructional papers may be stored within the void 56. The tube 52 may have instructions or warning labels or text affixed thereto.

Although the invention has been described as a system using carbon dioxide absorption materials, the invention encompasses exposing to the environment other gas absorbing materials such as materials suitable for absorbing carbon monoxide and odorous gas.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A delivery system for carbon dioxide absorption material comprising:
   a container for the storage of carbon dioxide absorption material, said container having an opening; and
   a receptacle capable of receiving carbon dioxide absorption materials, said receptacle having chambers, said chambers being open to said container, said receptacle having an open end, said open end of said receptacle being connectable to said container such that said open end of said receptacle surrounds said opening of said container, wherein said receptacle has a contact limiting membrane that substantially prohibits the passage of particulate matter from the carbon dioxide absorption material and allows the passage of gases therethrough.

2. The delivery system of claim 1, wherein said receptacle is connected to said container.

3. The delivery system of claim 1, wherein a fastener is provided to connect said receptacle to said container.

4. The delivery system of claim 3, wherein said fastener is a nylon electrical tie wrap.

5. The delivery system of claim 1, wherein said receptacle is ribbed to create said chambers.

6. The delivery system of claim 1, wherein said receptacle has at least one aperture suitable for hanging said receptacle.

7. The delivery system of claim 1, including a hanger to support said delivery system.

8. The delivery system of claim 1, wherein said contact limiting membrane is a fabric or flexible material.

9. The delivery system of claim 1, wherein said contact limiting membrane is a multi-layer polypropylene material.

10. The delivery system of claim 1, wherein the carbon dioxide absorption material is lithium hydroxide.

11. A delivery system for carbon dioxide absorption material comprising:
    a container for the storage of carbon dioxide absorption material; and
    a receptacle capable of receiving carbon dioxide absorption materials, said receptacle having chambers, said chambers being open to said container, said receptacle having an open end, said open end of said receptacle being connectable to said container such that said receptacle extends over at least a portion of the length of said container, wherein said receptacle has a contact limiting membrane that substantially prohibits the passage of particulate matter from the carbon dioxide absorption material and allows the passage of gases therethrough.

12. The delivery system of claim 11, wherein said receptacle is connected to said container.

13. The delivery system of claim 11, wherein a fastener is provided to attach said receptacle to said container.

14. The delivery system of claim 13, wherein said fastener is a nylon electrical tie wrap.

15. The delivery system of claim 11, wherein said receptacle is ribbed to create said chambers.

16. The delivery system of claim 11, wherein said receptacle has at least one aperture suitable for hanging said receptacle.

17. The delivery system of claim 11, including a hanger to support said delivery system.

18. The delivery system of claim 11, wherein said contact limiting membrane is a fabric or flexible material.

19. The delivery system of claim 11, wherein said contact limiting membrane is a multi-layer polypropylene.

20. The delivery system of claim 11, wherein said carbon dioxide absorption material is lithium hydroxide.

21. A delivery system for lithium hydroxide comprising:
    a container for the storage of lithium hydroxide, said container having an upwardly oriented opening; and
    a receptacle connected to said container and capable of receiving lithium hydroxide, said receptacle having an open end, said open end of said receptacle being connected to said container to surround said opening to prevent spilling of the lithium hydroxide when the lithium hydroxide is transferred between said container and said receptacle, wherein said receptacle has chambers, wherein said chambers are open to said container, and said receptacle has a contact limiting membrane that substantially prohibits the passage of particulate matter from the carbon dioxide absorption material and allows the passage of gases therethrouph.

22. The delivery system of claim 21, wherein said contact limiting membrane is a multi-layer polypropylene.

23. The delivery system of claim 21, wherein said receptacle is ribbed, and includes a fastener to attach said receptacle to said canister and includes a hanger to support said delivery system.

* * * * *

UNITED STATES PATENT AND TRADEMARK OFFICE
CERTIFICATE OF CORRECTION

PATENT NO. : 6,699,309 B1  Page 1 of 1
DATED : March 2, 2004
INVENTOR(S) : James T. Worthington, II et al.

It is certified that error appears in the above-identified patent and that said Letters Patent is hereby corrected as shown below:

<u>Column 6,</u>
Line 53, delete "cannister" and insert -- container --

Signed and Sealed this

Eighth Day of June, 2004

JON W. DUDAS
*Acting Director of the United States Patent and Trademark Office*